(12) United States Patent
Cao

(10) Patent No.: US 10,210,824 B2
(45) Date of Patent: Feb. 19, 2019

(54) DIGITAL POWER SUPPLY CIRCUIT AND LIQUID CRYSTAL DRIVING DEVICE

(71) Applicant: SHENZHEN CHINA STAR OPTOELECTRONICS TECHNOLOGY CO., LTD., Shenzhen (CN)

(72) Inventor: Dan Cao, Shenzhen (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 121 days.

(21) Appl. No.: 15/305,211

(22) PCT Filed: Jun. 30, 2016

(86) PCT No.: PCT/CN2016/087797
§ 371 (c)(1),
(2) Date: Oct. 19, 2016

(87) PCT Pub. No.: WO2017/197732
PCT Pub. Date: Nov. 23, 2017

(65) Prior Publication Data
US 2018/0166027 A1    Jun. 14, 2018

(30) Foreign Application Priority Data
May 20, 2016   (CN) .......................... 2016 1 0341031

(51) Int. Cl.
*G06F 3/038*   (2013.01)
*G09G 5/00*    (2006.01)
*G09G 3/36*    (2006.01)
*G09G 3/30*    (2006.01)
*H02H 3/20*    (2006.01)

(52) U.S. Cl.
CPC ................. *G09G 3/36* (2013.01); *H02H 3/20* (2013.01); *G09G 2310/0264* (2013.01); *G09G 2310/08* (2013.01)

(58) Field of Classification Search
CPC   G06F 3/14; H01L 2924/0002; H01L 2924/00
See application file for complete search history.

(56) References Cited

U.S. PATENT DOCUMENTS

2009/0185397 A1    7/2009   Forghani-zadeh et al.
2014/0354609 A1*  12/2014   Sawabe ................ G09G 3/3677
                                                                345/204
2016/0086542 A1*   3/2016   Lee ...................... G09G 3/2022
                                                                345/212

FOREIGN PATENT DOCUMENTS

CN   101841238 A   9/2010
CN   104319996 A   1/2015
CN   104753330 A   7/2015

* cited by examiner

*Primary Examiner* — Nan-Ying Yang
(74) *Attorney, Agent, or Firm* — JMB Davis Ben-David

(57) ABSTRACT

A digital power supply circuit and a liquid crystal driving device are provided. The digital power supply circuit includes a controlling module which includes an acquiring unit for acquiring a rate of change of the digital supply voltage at an initial stage, a comparing unit for comparing the rate of change with a preset threshold value, so as to generate a control signal according to the comparing result, and a voltage reducing unit for pulling-down an input voltage of the enable terminal by using the control signal when the rate of change is greater than the preset threshold value.

13 Claims, 3 Drawing Sheets

DIGITAL POWER SUPPLY CIRCUIT AND LIQUID CRYSTAL DRIVING DEVICE

CROSS-REFERENCE TO RELATED APPLICATIONS

This is the U.S. National Stage of International Patent Application No. PCT/CN2016/087797, filed Jun. 30, 2016, which in turn claims the benefit of China Patent Application No. 201610341031.2, filed May 20, 2016.

FIELD OF THE INVENTION

The present invention relates to the field of liquid crystal displays, and more particularly to a digital power supply circuit and a liquid crystal driving device.

BACKGROUND OF THE INVENTION

A typical liquid crystal display device includes a timing controller and a power management module. The timing controller generates a clock signal through a digital supply voltage provided by the power management module. However, when a typical power management module is at a soft start stage and because a surge protection function is not yet activated, an overshoot voltage appears in an output terminal. FIG. 1 shows a waveform of an output voltage from the typical power management module, where the x-axis designates the time axis and the y-axis designates the voltage value. From time 0 to t1, a growth rate of the output voltage (i.e., slope) is k1. When the time is at t1, the voltage value is m, such as 3.3V. However, after the time t1, the output voltage continues to increase, and then is decreased to m again. That is, from time t1 to t2, the voltage value is greater than 3.3V, so that the overshoot voltage appears. Moreover, at this stage, the growth rate of the voltage is obviously greater than k1. If the overshoot voltage appears in the output voltage from the power management module, it is easy to damage the timing controller, thereby increasing manufacturing cost.

Accordingly, it is necessary to provide a digital power supply circuit and a liquid crystal driving device to solve the technical problem in the prior art.

SUMMARY OF THE INVENTION

An object of the present invention is to provide a digital power supply circuit and a liquid crystal driving device, so as to solve the technical problem of high manufacturing cost caused from the timing controller lacking a protective function at a soft start stage in the prior art, so that if an overshoot appears in the output voltage from a power management module, it is easy to damage the timing controller.

In order to solve the technical problem mentioned above, the present invention provides a digital power supply circuit, comprising:

a power management module for providing a digital supply voltage to a timing controller, the power management module having a first output terminal and an enable terminal, the first output terminal used for outputting the digital supply voltage, and the enable terminal used for controlling the power management module to be turned-on or turned-off; and a controlling module, comprising:

an acquiring unit for acquiring a rate of change of the digital supply voltage at an initial stage;

a comparing unit for comparing the rate of change with a preset threshold value, so as to obtain a comparing result, thereby generating a control signal according to the comparing result; and a voltage reducing unit for pulling-down an input voltage of the enable terminal by using the control signal when the rate of change is greater than the preset threshold value, so as to turn-off the power management module;

wherein the acquiring unit comprises a first comparator and a capacitor, and the first comparator comprises a first input terminal, a second input terminal, and a second output terminal; the first input terminal is connected with the first output terminal through the capacitor, and the second input terminal is grounded; the first input terminal is also connected with the second output terminal; the second output terminal is used for outputting the rate of change of the digital supply voltage; and the comparing unit comprises a second comparator which includes a third input terminal, a fourth input terminal, and a third output terminal; the preset threshold value is inputted into the third input terminal, and the fourth input terminal is connected with the second output terminal, and the third output terminal is used for outputting the control signal.

In the digital power supply circuit of the present invention, the acquiring unit further comprises a first resistor which is connected between the capacitor and the first output terminal.

In the digital power supply circuit of the present invention, the acquiring unit further comprises a second resistor, and a terminal of the second resistor is connected between the capacitor and the first input terminal, and another terminal of the second resistor is connected with the second output terminal.

In the digital power supply circuit of the present invention, the voltage reducing unit comprises a control terminal, a fifth input terminal, and a fourth output terminal, and the fifth input terminal is connected with the enable terminal, the control terminal is connected with the third output terminal, and the fourth output terminal is grounded.

In order to solve the technical problem mentioned above, the present invention also provides a digital power supply circuit, comprising:

a power management module for providing a digital supply voltage to a timing controller, the power management module having a first output terminal and an enable terminal, the first output terminal used for outputting the digital supply voltage, and the enable terminal used for controlling the power management module to be turned-on or turned-off; and a controlling module, comprising:

an acquiring unit for acquiring a rate of change of the digital supply voltage at an initial stage;

a comparing unit for comparing the rate of change with a preset threshold value, so as to obtain a comparing result, thereby generating a control signal according to the comparing result; and a voltage reducing unit for pulling-down an input voltage of the enable terminal by using the control signal when the rate of change is greater than the preset threshold value, so as to turn-off the power management module.

In the digital power supply circuit of the present invention, the acquiring unit comprises a first comparator, and the first comparator comprises a first input terminal, a second input terminal, and a second output terminal;

the first input terminal is connected with the first output terminal, and the second input terminal is grounded; the first input terminal is also connected with the second output terminal; the second output terminal is used for outputting the rate of change of the digital supply voltage.

In the digital power supply circuit of the present invention, the acquiring unit further comprises a capacitor, a terminal of the capacitor is connected with the first output terminal, and another terminal of the capacitor is connected with the first input terminal.

In the digital power supply circuit of the present invention, the acquiring unit further comprises a first resistor which is connected between the capacitor and the first output terminal.

In the digital power supply circuit of the present invention, the acquiring unit further comprises a second resistor, and a terminal of the second resistor is connected between the capacitor and the first input terminal, and another terminal of the second resistor is connected with the second output terminal.

In the digital power supply circuit of the present invention, the comparing unit comprises a second comparator which includes a third input terminal, a fourth input terminal, and a third output terminal; and the preset threshold value is inputted into the third input terminal, and the fourth input terminal is connected with the second output terminal, and the third output terminal is used for outputting the control signal.

In the digital power supply circuit of the present invention, the voltage reducing unit comprises a control terminal, a fifth input terminal, and a fourth output terminal, and the fifth input terminal is connected with the enable terminal, the control terminal is connected with the third output terminal, and the fourth output terminal is grounded.

The present invention also provides a liquid crystal driving device, comprising:

a digital power supply circuit, comprising:

a power management module for providing a digital supply voltage to a timing controller, the power management module having a first output terminal and an enable terminal, the first output terminal used for outputting the digital supply voltage, and the enable terminal used for controlling the power management module to be turned-on or turned-off; and a controlling module, comprising:

an acquiring unit for acquiring a rate of change of the digital supply voltage at an initial stage;

a comparing unit for comparing the rate of change with a preset threshold value, so as to obtain a comparing result, thereby generating a control signal according to the comparing result; and a voltage reducing unit for pulling-down an input voltage of the enable terminal by using the control signal when the rate of change is greater than the preset threshold value, so as to turn-off the power management module.

In the liquid crystal driving device of the present invention, the acquiring unit comprises a first comparator, and the first comparator comprises a first input terminal, a second input terminal, and a second output terminal;

the first input terminal is connected with the first output terminal, and the second input terminal is grounded; the first input terminal is also connected with the second output terminal; the second output terminal is used for outputting the rate of change of the digital supply voltage.

In the liquid crystal driving device of the present invention, the acquiring unit further comprises a capacitor, a terminal of the capacitor is connected with the first output terminal, and another terminal of the capacitor is connected with the first input terminal.

In the liquid crystal driving device of the present invention, the acquiring unit further comprises a first resistor which is connected between the capacitor and the first output terminal.

In the liquid crystal driving device of the present invention, the acquiring unit further comprises a second resistor, and a terminal of the second resistor is connected between the capacitor and the first input terminal, and another terminal of the second resistor is connected with the second output terminal.

In the liquid crystal driving device of the present invention, the comparing unit comprises a second comparator which includes a third input terminal, a fourth input terminal, and a third output terminal; and the preset threshold value is inputted into the third input terminal, and the fourth input terminal is connected with the second output terminal, and the third output terminal is used for outputting the control signal.

In the liquid crystal driving device of the present invention, the voltage reducing unit comprises a control terminal, a fifth input terminal, and a fourth output terminal, and the fifth input terminal is connected with the enable terminal, the control terminal is connected with the third output terminal, and the fourth output terminal is grounded.

In the digital power supply circuit and the liquid crystal driving device of the present invention, a controlling module is provided to connect with an output terminal of a power management module, so that if a rate of change of an output voltage from the power management module is greater than a preset threshold value, a voltage at an enable terminal is pulled-down, so as to turn-off the power management module for preventing an overshoot appearing in the output voltage, thereby avoiding the timing controller damage and decreasing the manufacturing cost.

DETAILED DESCRIPTION OF THE INVENTION

Figure 1:
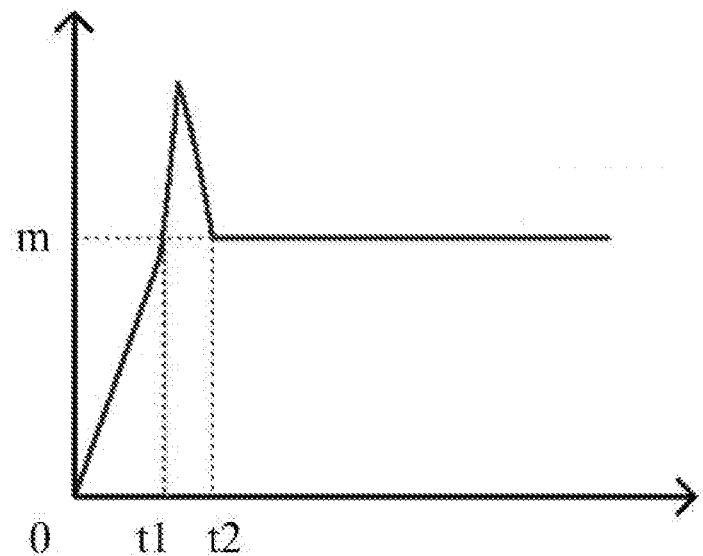
FIG. 1 is a waveform of output voltage from a power management module in the prior art.

The following embodiments refer to the accompanying drawings for exemplifying specific implementable embodiments of the present invention. Furthermore, directional terms described by the present invention, such as upper, lower, front, back, left, right, inner, outer, side, etc., are only directions by referring to the accompanying drawings, and thus the used directional terms are used to describe and understand the present invention, but the present invention is not limited thereto. In the drawings, the same reference symbol represents the same or similar components.

Figure 2:
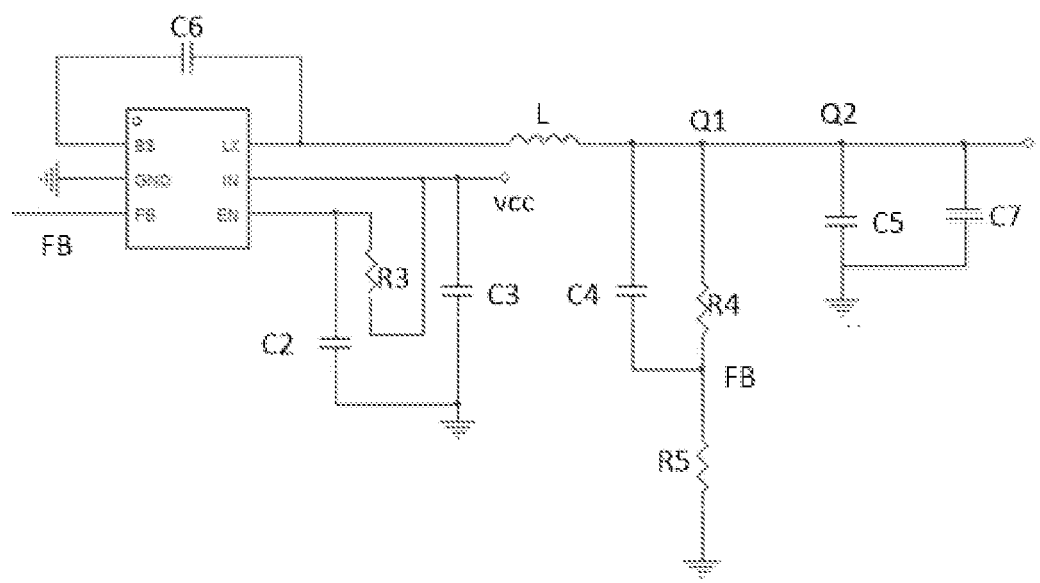
FIG. 2 is a circuit diagram of the power management module in the prior art.

Please refer to FIG. 2, which is a circuit diagram of the power management module in the prior art.

In the prior art, the power management module comprises a switching power supply chip which is used for decreasing voltage. That is, the switching power supply chip comprises a BS pin, a GND pin, an FB pin, an LX pin, an IN pin, and an EN pin. The BS pin is used for connecting with a self-sufficient capacitor. A feedback voltage is inputted into the FB pin. A switch signal is inputted into the LX pin. A power VCC is inputted into the IN pin. An enable signal is inputted into the EN pin. The BS pin is connected with the LX pin through a capacitor C6. The GND pin is grounded. The IN pin is connected with the EN pin through a resistor R3. The EN pin is also grounded through a capacitor C2. The IN pin is grounded through a capacitor C3. The LX pin is connected with the output terminal through an inductor L. An output terminal outputs a digital supply voltage. A first node Q1 located between the inductor L and the output terminal is grounded through a series branch of a resistor R4 and a resistor R5. The resistor R4 is connected with a capacitor C4 in parallel. A second node Q2 located between the inductor L and the output terminal is grounded through a capacitor C5. The node Q2 and the output terminal are also grounded through a capacitor C7.

That is, the switching power supply chip uses energy storage ability of the capacitors and the inductor to perform high-frequency switching through a controllable switch. Input energy is stored in the capacitors or the inductor. When the switch is turned off, the energy is discharged to a load, so as to provide energy, where output of voltage corresponds to a duty cycle (i.e., a ratio of a turn-on time to an entire period of the switch). In addition, the amount of the feedback voltage, inputted into the FB pin, is adjusted through a ratio of the resistor R4 to the resistor R5, so as to decrease the voltage.

Figure 3:
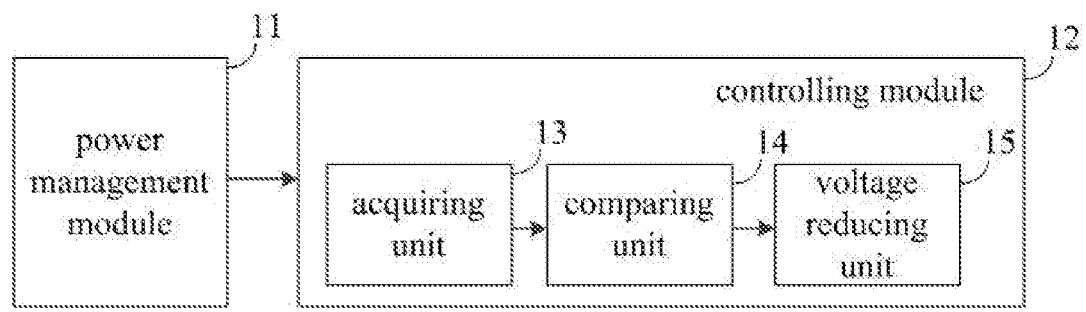
FIG. 3 is a structural schematic diagram of a digital power supply circuit of the present invention.

Please refer to FIG. 3, which is a structural schematic diagram of a digital power supply circuit of the present invention.

As shown in FIG. 3, the digital power supply circuit of the present invention comprises a power management module 11 and a controlling module 12. The controlling module 12 comprises an acquiring unit 13, a comparing unit 14, and a voltage reducing unit 15.

The power management module 11 is used for providing a digital supply voltage to a timing controller. The power management module has a first output terminal and an enable terminal (i.e., an EN pin in FIG. 5). The first output terminal is used for outputting the digital supply voltage, and the enable terminal is used for controlling the power management module to be turned-on or turned-off.

The acquiring unit 13 is used for acquiring a rate of change of the digital supply voltage at an initial stage (i.e., at a soft start stage).

The comparing unit 14 is used for comparing the rate of change with a preset threshold value, so as to obtain a comparing result, thereby generating a control signal according to the comparing result.

The voltage reducing unit 15 is used for pulling-down an input voltage of the enable terminal by using the control signal when the rate of change is greater than the preset threshold value, so as to turn-off the power management module.

Figure 4:
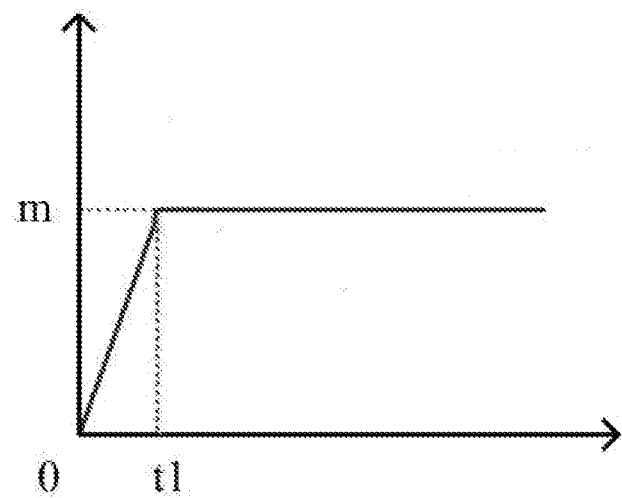
FIG. 4 is a waveform of output voltage from a power management module of the present invention.

Referring to FIG. 1, in order to prevent overly high rates from occurring when the power management module experiences an overshoot voltage (i.e., the slope is greater than the slope k1 which meets requirements without the overshoot voltage appearing), a voltage at the enable terminal is pulled-down when the controlling module 12 detects that a growth rate of the digital supply voltage outputted by the power management module 11 is greater than k1. The power management module 11 only operates properly when the enable terminal is at a high voltage. Hence, when the voltage at the enable terminal is pulled-down, the power management module 11 is consequentially turned-off, to prevent the voltage overshoot, thereby preventing the timing controller from damage. As shown in FIG. 4, the output voltage from the power management module is processed by the controlling module, the maximum value of the output voltage is m, so that the voltage overshoot will not occur.

In the digital power supply circuit and the liquid crystal driving device of the present invention, the controlling module is provided to connect with the output terminal of the power management module, so that if the rate of change of the output voltage from the power management module is greater than the preset threshold value, the voltage at an enable terminal is pulled-down, so as to turn-off the power management module for preventing the overshoot appearing in the output voltage, thereby avoiding timing controller damage and decreasing manufacturing cost.

Figure 5:
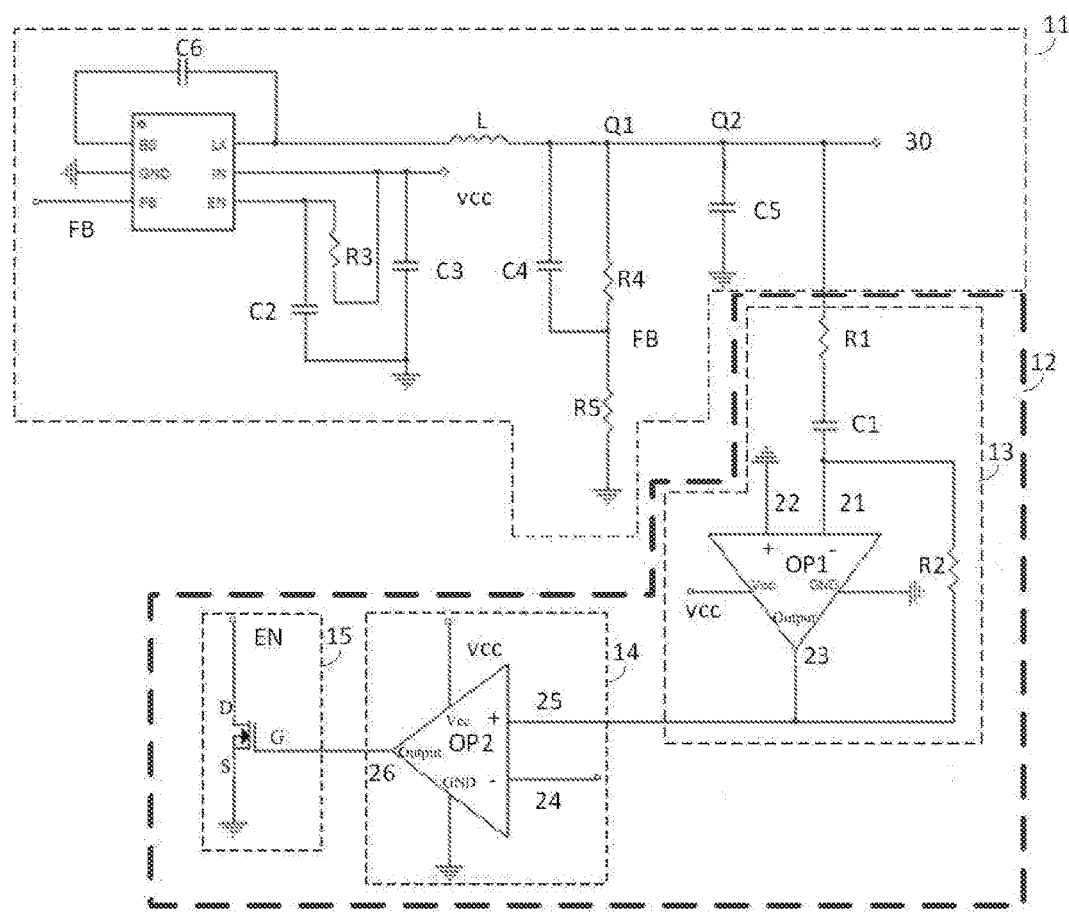
FIG. 5 is a circuit diagram of the digital power supply circuit of a preferred embodiment of the present invention.

FIG. 5 is a circuit diagram of the digital power supply circuit of a preferred embodiment of the present invention. The acquiring unit 13 comprises a first comparator OP1, a capacitor C1, a first resistor R1, and a second resistor R2. The first comparator OP1 comprises a first input terminal 21 (cathode), a second input terminal 22 (anode), and a second output terminal 23 (output), and also comprises a power supply input terminal and a ground terminal. The power VCC is inputted into the power supply input terminal VCC. The connecting terminal GND is grounded.

The first input terminal 21 may be connected with the first output terminal 30 through the capacitor C1. The first resistor R1 is connected between the capacitor C1 and the first output terminal 30. The second input terminal 22 is grounded. The second output terminal 23 may be connected between the capacitor C1 and the first input terminal 21 through the second resistor R2. The digital supply voltage is inputted into the first input terminal 21. The second output terminal 23 is used for outputting the rate of change of the digital supply voltage.

The comparing unit 14 comprises a second comparator OP2. The second comparator OP2 comprises a third input terminal 24 (cathode), a fourth input terminal 25 (anode), and a third output terminal 26 (output), and also comprises a power supply input terminal and a ground terminal. The power VCC is inputted into the power supply input terminal VCC. The connecting terminal GND is grounded. The preset threshold value (k1) is inputted into the third input terminal 24. The fourth input terminal 25 is connected with the second output terminal 23. The third output terminal 26 is used for outputting the control signal.

The voltage reducing unit 15 comprises a control terminal G (gate), a fifth input terminal D (drain), and a fourth output terminal S (source).

The fifth input terminal D is connected with the enable terminal EN. The control terminal G is connected with the third output terminal 26. The fourth output terminal S is grounded.

In the specific working process, the digital supply voltage OVDD outputted by the first output terminal 30 of the power management module 11 is inputted into the first comparator OP1, and then it is processed by the first comparator OP1 and a slope k2 of the OVDD is outputted. Then, the second comparator OP2 compares k2 with k1, if k2 is greater than k1, the second comparator OP2 outputs a positive voltage, such that the transistor is turned-on. Since the output terminal of the transistor is grounded, and the output terminal is connected with the enable terminal, the voltage of the enable terminal is pulled-down, thereby stopping operation of the power management module. If k2 is less than k1, the second comparator OP2 outputs a negative voltage, such that the transistor is turned-off. Thus, the voltage of the enable terminal will not be pulled-down, and the power management module 11 continues to work.

The power management module 11 comprises a switching power supply chip which is used for decreasing voltage. That is, the switching power supply chip comprises a BS pin, a GND pin, an FB pin, an LX pin, an IN pin, and an EN pin. A self-sufficient capacitor is inputted into the BS pin. A feedback voltage is inputted into the FB pin. A switch signal is inputted into the LX pin. A power is inputted into the IN pin. An enable signal is inputted into the EN pin. The BS pin is connected with the LX pin through a capacitor C6. The GND pin is grounded. The IN pin is connected with the EN pin through a resistor R3. The EN pin is also grounded through a capacitor C2. The IN pin is grounded through a capacitor C3. The LX pin is connected with the first output terminal 30 through an inductor L. The first output terminal 30 outputs a digital supply voltage. A first node Q1 located between the inductor L and the first output terminal 30 is grounded through a series branch of a resistor R4 and a resistor R5. The resistor R4 is connected with a capacitor C4 in parallel. A second node Q2 located between the inductor L and the first output terminal 30 is grounded through a capacitor C5.

That is, the switching power supply chip uses an energy storage characteristic of the capacitors and the inductor to perform high-frequency switching through a controllable switch. An inputted electric energy is stored in the capacitors or the inductor. When the switch is turn-off, the electric energy is discharged to a load, so as to provide energy, where an ability of outputting voltage corresponds to a duty cycle (i.e., a ratio of a turn-on time to whole period of the switch). In addition, the amount of the feedback voltage which is inputted into the FB pin is adjusted through a ratio of the resistor R4 to the resistor R5, so as to decrease the voltage.

The present invention also provides a liquid crystal driving device which comprises the digital power supply circuit mentioned above.

As shown in FIG. 3, the digital power supply circuit of the present invention comprises a power management module 11 and a controlling module 12. The controlling module 12 comprises an acquiring unit 13, a comparing unit 14, and a voltage reducing unit 15.

The power management module 11 is used for providing a digital supply voltage to a timing controller. The power management module has a first output terminal and an enable terminal (i.e., an EN pin in FIG. 5). The first output terminal is used for outputting the digital supply voltage, and the enable terminal is used for controlling the power management module to be turned-on or turned-off.

The acquiring unit 13 is used for acquiring a rate of change of the digital supply voltage at an initial stage (i.e., at a soft start stage).

The comparing unit 14 is used for comparing the rate of change with a preset threshold value, so as to obtain a comparing result, thereby generating a control signal according to the comparing result.

The voltage reducing unit 15 is used for pulling-down an input voltage of the enable terminal by using the control signal when the rate of change is greater than the preset threshold value, so as to turn-off the power management module.

Referring to FIG. 1, in order to prevent overly high rates from occurring when the power management module experiences an overshoot voltage (i.e., the slope is greater than the slope k1 which meets requirements without the overshoot voltage appearing), a voltage at the enable terminal is pulled-down when the controlling module 12 detects that a growth rate of the digital supply voltage outputted by the power management module 11 is greater than k1. The power management module 11 only operates properly when the enable terminal is at a high voltage. Hence, when the voltage at the enable terminal is pulled-down, the power management module 11 is consequentially turned-off, to prevent the voltage overshoot, thereby preventing the timing controller from damage. As shown in FIG. 4, the output voltage from the power management module is processed by the controlling module, the maximum value of the output voltage is m, so that the voltage overshoot will not occur.

FIG. 5 is a circuit diagram of the digital power supply circuit of a preferred embodiment of the present invention. The acquiring unit 13 comprises a first comparator OP1, a capacitor C1, a first resistor R1, and a second resistor R2. The first comparator OP1 comprises a first input terminal 21 (cathode), a second input terminal 22 (anode), and a second output terminal 23 (output), and also comprises a power supply input terminal and a ground terminal. The power VCC is inputted into the power supply input terminal VCC. The connecting terminal GND is grounded.

The first input terminal 21 may be connected with the first output terminal 30 through the capacitor C1. The first resistor R1 is connected between the capacitor C1 and the first output terminal 30. The second input terminal 22 is grounded. The second output terminal 23 may be connected between the capacitor C1 and the first input terminal 21 through the second resistor R2. The digital supply voltage is inputted into the first input terminal 21. The second output terminal 23 is used for outputting a changing rate of the digital supply voltage.

The comparing unit 14 comprises a second comparator OP2. The second comparator OP2 comprises a third input terminal 24 (cathode), a fourth input terminal 25 (anode), and a third output terminal 26 (output), and also comprises a power supply input terminal and a ground terminal. The power VCC is inputted into the power supply input terminal VCC. The connecting terminal GND is grounded.

The preset threshold value (k1) is inputted into the third input terminal 24. The fourth input terminal 25 is connected with the second output terminal 23. The third output terminal 26 is used for outputting the control signal.

The voltage reducing unit 15 comprises a control terminal G (gate), a fifth input terminal D (drain), and a fourth output terminal S (source).

The fifth input terminal D is connected with the enable terminal EN. The control terminal G is connected with the third output terminal 26. The fourth output terminal S is grounded.

In a specific working process, the digital supply voltage OVDD outputted by the first output terminal 30 of the power management module 11 is inputted into the first comparator OP1, and then it is processed by the first comparator OP1 and a slope k2 of the OVDD is outputted. Then, the second comparator OP2 compares k2 with k1, and if k2 is greater than k1, the second comparator OP2 outputs a positive voltage, such that the transistor is turned-on. Since the output terminal of the transistor is grounded, and the output terminal is connected with the enable terminal, the voltage of the enable terminal is pulled-down, thereby stopping operation of the power management module. If k2 is less than k1, the second comparator OP2 outputs a negative voltage, such that the transistor is turned-off. Thus, the voltage of the enable terminal will not be pulled-down, and the power management module 11 continues to work.

In the liquid crystal driving device of the present invention, the controlling module is provided to connect with the output terminal of the power management module, so that if the rate of change of the output voltage from the power management module is greater than the preset threshold value, the voltage at an enable terminal is pulled-down. Thus, the power management module is turned off to prevent an overshoot in the output voltage, thereby preventing the timing controller from damage and decreasing manufacturing cost.

The above descriptions are merely preferable embodiments of the present invention, and are not intended to limit the scope of the present invention. Any modification or replacement made by those skilled in the art without departing from the spirit and principle of the present invention should fall within the protection scope of the present invention. Therefore, the protection scope of the present invention is subject to the appended claims.

What is claimed is:

1. A digital power supply circuit, comprising:
    a power management module providing a digital supply voltage to a timing controller, the power management module having a first output terminal and an enable terminal, the first output terminal used for outputting the digital supply voltage, and the enable terminal used for controlling the power management module to be turned-on or turned-off; and
    a controlling module, comprising:
    an acquiring unit acquiring a rate of change of the digital supply voltage at an initial stage;
    a comparing unit comparing the rate of change with a preset threshold value, so as to obtain a comparing result, thereby generating a control signal according to the comparing result; and
    a voltage reducing unit pulling-down an input voltage of the enable terminal by using the control signal when the rate of change is greater than the preset threshold value, so as to turn-off the power management module;
    wherein the acquiring unit comprises a first comparator and a capacitor, and the first comparator comprises a first input terminal, a second input terminal, and a second output terminal; the first input terminal is connected with the first output terminal through the capacitor, and the second input terminal is grounded; the first input terminal is also connected with the second output terminal; the second output terminal is used for outputting the rate of change of the digital supply voltage; and
    the comparing unit comprises a second comparator which includes a third input terminal, a fourth input terminal, and a third output terminal; the preset threshold value is inputted into the third input terminal, and the fourth input terminal is connected with the second output terminal, and the third output terminal is used for outputting the control signal;
    wherein the acquiring unit further comprises a second resistor, and a terminal of the second resistor is connected between the capacitor and the first input terminal, and another terminal of the second resistor is connected with the second output terminal.

2. The digital power supply circuit as claimed in claim 1, wherein the acquiring unit further comprises a first resistor which is connected between the capacitor and the first output terminal.

3. The digital power supply circuit as claimed in claim 1, wherein the voltage reducing unit comprises a control terminal, a fifth input terminal, and a fourth output terminal, and the fifth input terminal is connected with the enable terminal, the control terminal is connected with the third output terminal, and the fourth output terminal is grounded.

4. A digital power supply circuit, comprising:
    a power management module providing a digital supply voltage to a timing controller, the power management module having a first output terminal and an enable terminal, the first output terminal used for outputting the digital supply voltage, and the enable terminal used for controlling the power management module to be turned-on or turned-off; and
    a controlling module, comprising:
    an acquiring unit acquiring a rate of change of the digital supply voltage at an initial stage;
    a comparing unit comparing the rate of change with a preset threshold value, so as to obtain a comparing result, thereby generating a control signal according to the comparing result; and
    a voltage reducing unit pulling-down an input voltage of the enable terminal by using the control signal when the rate of change is greater than the preset threshold value, so as to turn-off the power management module;
    wherein the acquiring unit comprises a first comparator, and the first comparator comprises a first input terminal, a second input terminal, and a second output terminal;
    the first input terminal is connected with the first output terminal, and the second input terminal is grounded; the first input terminal is also connected with the second output terminal; the second output terminal is used for outputting the rate of change of the digital supply voltage; and
    wherein the acquiring unit further comprises a capacitor, a terminal of the capacitor is connected with the first output terminal, and another terminal of the capacitor is connected with the first input terminal.

5. The digital power supply circuit as claimed in claim 4, wherein the acquiring unit further comprises a first resistor connected between the capacitor and the first output terminal.

6. The digital power supply circuit as claimed in claim 4, wherein the acquiring unit further comprises a second resistor, and a terminal of the second resistor is connected between the capacitor and the first input terminal, and another terminal of the second resistor is connected with the second output terminal.

7. The digital power supply circuit as claimed in claim 4, wherein the comparing unit comprises a second comparator which includes a third input terminal, a fourth input terminal, and a third output terminal; and
    the preset threshold value is inputted into the third input terminal, and the fourth input terminal is connected with the second output terminal, and the third output terminal is used for outputting the control signal.

8. The digital power supply circuit as claimed in claim 7, wherein the voltage reducing unit comprises a control terminal, a fifth input terminal, and a fourth output terminal, and the fifth input terminal is connected with the enable terminal, the control terminal is connected with the third output terminal, and the fourth output terminal is grounded.

9. A liquid crystal driving device, comprising:
    a digital power supply circuit, comprising:
    a power management module providing a digital supply voltage to a timing controller, the power management module having a first output terminal and an enable terminal, the first output terminal used for outputting the digital supply voltage, and the enable terminal used for controlling the power management module to be turned-on or turned-off; and a controlling module, comprising:

an acquiring unit acquiring a rate of change of the digital supply voltage at an initial stage;

a comparing unit comparing the rate of change with a preset threshold value, so as to obtain a comparing result, thereby generating a control signal according to the comparing result; and a voltage reducing unit pulling-down an input voltage of the enable terminal using the control signal when the rate of change is greater than the preset threshold value, so as to turn-off the power management module;

wherein the acquiring unit comprises a first comparator, and the first comparator comprises a first input terminal, a second input terminal, and a second output terminal;

the first input terminal is connected with the first output terminal, and the second input terminal is grounded; the first input terminal is also connected with the second output terminal; the second output terminal is used for outputting the rate of change of the digital supply voltage;

wherein the acquiring unit further comprises a capacitor, a terminal of the capacitor is connected with the first output terminal, and another terminal of the capacitor is connected with the first input terminal.

10. The liquid crystal driving device as claimed in claim 9, wherein the acquiring unit further comprises a first resistor connected between the capacitor and the first output terminal.

11. The liquid crystal driving device as claimed in claim 9, wherein the acquiring unit further comprises a second resistor, and a terminal of the second resistor is connected between the capacitor and the first input terminal, and another terminal of the second resistor is connected with the second output terminal.

12. The liquid crystal driving device as claimed in claim 9, wherein the comparing unit comprises a second comparator which includes a third input terminal, a fourth input terminal, and a third output terminal; and the preset threshold value is inputted into the third input terminal, and the fourth input terminal is connected with the second output terminal, and the third output terminal is used for outputting the control signal.

13. The liquid crystal driving device as claimed in claim 12, wherein the voltage reducing unit comprises a control terminal, a fifth input terminal, and a fourth output terminal, and the fifth input terminal is connected with the enable terminal, the control terminal is connected with the third output terminal, and the fourth output terminal is grounded.

* * * * *